Patented July 17, 1951

2,560,638

UNITED STATES PATENT OFFICE 2,560,638

MANUFACTURE OF CELLULOSE

Henry Dreyfus, deceased, late of London, England, by Claude Bonard, administrator, London, England, assignor to Celanese Corporation of America, a corporation of Delaware No Drawing. Application October 3, 1945, Serial No. 620,182. In Great Britain March 16, 1944

Section 1, Public Law 690, August 8, 1946
Patent expires March 16, 1964

8 Claims. (Cl. 92—16)

This invention relates to the production of cellulose from lignocellulosic materials, especially from straw.

Although straw resembles wood in consisting mainly of cellulose, hemicelluloses (mainly pentosans), and lignin, the production of relatively pure cellulose from straw presents difficulties which are not encountered when cellulose of a similar standard of purity is made from most woods. For instance, cellulose obtained from wood by the usual methods (e. g. by the sulphite and soda processes) usually contains about 5% of hemicelluloses, and this figure can easily be reduced to 1% or less by treatment with alkali. On the other hand, cellulose obtained from straw by similar methods may contain anything up to 30% of hemicelluloses, and the reduction of this figure even to 2-3% is far from easy. Another problem is presented by the high proportion of silica, usually about 4-5%, contained in straw, since silica is one of the most difficult of all inorganic substances to remove from lignocellulosic materials.

The present invention aims at providing a method for obtaining from straw a cellulose which contains relatively small proportions of hemicelluloses and other impurities, and which is suitable for conversion into cellulose acetate and other organic derivatives of cellulose.

According to the present invention lignocellulosic materials, especially straw, are subjected to the action of a hot aqueous aliphatic alcohol of concentration at least 85% containing a small proportion of a mineral acid, and the product so obtained is treated with an alkaline solution. Preferably the concentration of the alcohol does not exceed 95%. As the mineral acid it is preferred to employ hydrogen chloride.

Before being subjected to the process of the present invention straw is preferably broken up into small pieces, for example by chopping, and the chopped straw may with advantage be sieved so as to remove fine particles and dust which are found to have a disproportionately large content of mineral matter including silica.

The treatment of the materials with alcohol is preferably preceded by a pretreatment with a dilute alkali solution. For this pretreatment, which removes certain loosely bound gummy materials as well as a considerable proportion of the silica and other inorganic constituents of the straw, it is preferable to use an alkali metal hydroxide solution of concentration about ½-2%; preferably the straw is heated in the alkali solution to about 115-125° C., but quite good results are obtained by boiling the solution under atmospheric pressure. It is not necessary to make use of a fresh alkali solution for this pretreatment; alkali which has already been used to remove hemicelluloses from cellulose and which therefore contains hemicelluloses in solution, may be used after any necessary adjustment of the concentration. After the pretreatment the straw is separated from the alkali solution, washed with cold or warm water and drained.

It has been found that this pretreatment, besides removing certain constituents of the straw, has an important softening effect, and in particular that the harder parts of the straw which are originally very resistant to attack either by mechanical or chemical agencies lose much of their hardness, and are readily broken down by mechanical means to such an extent that they are efficiently attacked in the following chemical operations. The straw after being removed from the alkali pretreatment solution and washed may therefore with advantage be passed while still wet through some form of disintegrating machine. After the pretreatment and the disintegrating step the straw is well dried and is then ready for the first stage of the main treatment.

As already indicated, this first stage consists in acting on the straw at a raised temperature with an aqueous aliphatic alcohol containing a mineral acid, preferably hydrochloric acid. As the alcohol it is preferred to employ a lower aliphatic alcohol, for example isopropyl alcohol, and especially ethyl alcohol. If desired a mixture of two or more alcohols may be used. The concentration of the alcohol, allowing for such water as is still retained in the dry pretreated straw, is preferably about 90-95%. The amount of the alcoholic liquor is preferably between about 8 and 15 times the weight of the original dry straw. The liquor preferably contains only a small proportion of the acid, e. g. between ½ and 2½% of the weight of the aqueous alcohol, and in most cases the best yields of cellulose are obtained with liquors containing about 1% of hydrochloric acid. With a typical straw, good results are obtained by boiling the dried pretreated straw under reflux for 4-6 hours with 10 parts by weight (for each part of original dry straw) of 90% aqueous ethyl alcohol containing 1% of hydrochloric acid.

After the boil with the alcoholic liquor, the straw is freed from the liquor in readiness for the second stage of the treatment. The alcoholic liquor may first be drained off, and as it contains only a relatively low proportion of solids, it may be used again after making any necessary adjustment of the concentration or acid content. The straw may then be washed with further quantities of aqueous alcohol.

Although the amount of solid matter actually removed by the alcoholic liquor is small, the lignin in the straw has undergone considerable change, probably a hydrolysis or alcoholysis, and has become soluble in hot dilute alkali solution. The second stage of the process therefore consists in heating the straw with a dilute alkali solution in order to remove the altered lignin. Advantageously the straw may be given an open boil, lasting an hour or more, with a sodium hydroxide solution of concentration between ½% and 2½%, and especially about 1%. More vigorous conditions may be employed but usually without improving either the yield or the quality of the cellulose produced. After the boil the waste alkali liquor is removed from the crude cellulose, for example by decantation or filtration, and the cellulose is well washed.

The crude cellulose so obtained still contains a considerable amount of non-cellulosic impurities, mainly pentosans and other hemicelluloses, and is therefore usually subjected to further treatment for the removal of these substances. Such further treatment may with advantage comprise two or more treatments with alkali solutions under varying conditions, and at least one bleaching operation. Preferably the crude cellulose is first bleached, for example with a chlorinating agent such as a hypochlorite. Thus the cellulose may be immersed in an aqueous solution of calcium hypochlorite at 20–25° C. until absorption of chlorine by the cellulose ceases, and may then be thoroughly washed and partially dried in readiness for the alkali treatment. This preferably consists of at least the following two operations. First the cellulose is treated in the cold with a fairly concentrated alkali solution such as is used for mercerising cotton; for instance the cellulose may be treated for one or two hours with a 10–15% sodium hydroxide solution in amount 5 to 12 times the weight of the partially dried cellulose, the solution being stirred or otherwise agitated throughout. At the end of this period the cellulose is separated from the alkali solution and thoroughly washed. The second operation is a boil with a dilute alkali solution under atmospheric pressure; for example the cellulose may be boiled with ten to twenty times its weight of a 0.4–0.8% sodium hydroxide solution for an hour, and may then again be washed free from alkali. After these treatments the cellulose may with advantage be given a final bleach with a very dilute calcium hypochlorite or equivalent solution.

This two-stage alkali treatment may be modified in various ways, especially by introducing further treatments with alkali or acid between the main bleaching operation and the treatment with the "mercerising" alkali solution. For example, the bleach may be followed by successive treatments with a cold alkali solution of concentration about 6% and with boiling dilute (e. g. 0.4–0.8%) alkali, or by successive treatments with the cold 6% alkali and a hot dilute acid, for example hydrochloric acid of concentration in the neighbourhood of 0.5%. In another modification the bleach may be followed immediately (after the cellulose has been washed) by a boil with dilute hydrochloric acid, and the cellulose then treated with the "mercerising" alkali. In all cases after each operation the cellulose should be washed until it is substantially free from the alkaline or acid reagent or bleaching agent.

As has already been indicated, the process described above is of particular value in the production of cellulose from straw. It may, however, also be applied to the production of cellulose from other lignocellulosic materials, for example from deciduous and coniferous woods, or from grasses, bamboo and the like. Cellulose produced from straw or other materials by the new process is suitable for conversion into cellulose esters, e. g. cellulose acetate, or cellulose ethers, and also for the production of viscose and for paper-making and like purposes. When it is to be used for the production of cellulose esters of organic acids it may first be subjected to a pretreatment with an acid, preferably acetic or formic acid.

The following examples illustrate the invention:

*Example 1*

Straw was chopped and sieved free from dust, and was then given an open boil with ten times its weight of a 1% sodium hydroxide solution for an hour. The straw was then filtered off, washed free from alkali, mechanically disintegrated yet further, and then dried.

The dried pretreated straw was boiled under reflux for five hours with ten times its original weight (i. e. its weight before the alkali pretreatment) of 90% ethyl alcohol containing 1% of hydrogen chloride. The mixture was then cooled, and the solid product was filtered off, well washed first with 90% ethyl alcohol and then with water, and boiled for an hour with a 1% sodium hydroxide solution in amount ten times the original weight of the straw. The product was filtered off, washed until free from alkali, and then bleached with calcium hypochlorite. It now consisted mainly of cellulose, contaminated with pentosans and other hemicelluloses, but containing little or no lignin.

This crude cellulose was subjected to the following treatment to remove the greater part of the hemicelluloses. First it was boiled under a reflux condenser with 0.5% aqueous hydrogen chloride for about one hour, filtered off and washed until neutral. Then it was agitated for an hour with a 12% aqueous solution of sodium hydroxide, filtered off and washed, and given an open boil with a 0.5% sodium hydroxide solution, filtered off, and washed. Finally it was given another bleach with a small amount of calcium hypochorite, washed first with dilute acid and then with water, and dried.

*Example 2*

Chopped and sieved straw was heated to 125° C. with ten times its weight of a 1.5% sodium hydroxide solution for one hour, and the product filtered off, washed free from alkali, mechanically disintegrated and dried.

The dried pretreated straw was boiled under reflux with ten times its original weight of 94% ethyl alcohol containing 1% of hydrogen chloride. After four hours the mixture was cooled and the solid product filtered off and washed first with 90% ethyl alcohol and then with water. It was then boiled for one hour with a 2% sodium hydroxide solution, filtered off, washed, and given a bleach with calcium hypochlorite.

The crude cellulose so obtained was then purified by the process described in Example 1, except that the boil with acid was replaced by a treatment first for one hour with a cold 6% sodium hydroxide solution, and then for one hour with a boiling 0.5% sodium hydroxide solution.

*Example 3*

Chopped and sieved straw was heated to 120° C. with ten times its weight of 1% sodium hydroxide solution for one hour, washed, further disintegrated, and dried.

The dried pretreated straw was boiled for four hours under a reflux condenser with ten times its original weight of the ethyl alcohol remaining at the end of the treatment described in Example 2, and the mixture was then cooled, and the solid product washed, boiled with a 2% sodium hydroxide solution, bleached and further purified, all as described in Example 2.

Although the invention has been described with particular reference to monohydric alcohols, and especially ethyl alcohol, use may also be made of dihydric or polyhydric aliphatic alcohols, for example ethylene glycol or glycerol, or the partial ethers of such compounds, for example the methyl ether of ethylene glycol, or mixtures of such compounds with ethyl alcohol. But whatever the particular alcohol employed, it is important that the limits of concentration set out above should be adhered to.

Having described the invention, what is desired to be secured by Letters Patent is:

1. Process for the production of cellulose from ligno-cellulosic materials, which comprises pre-digesting the materials with a hot dilute alkali solution, then rendering lignin in the materials soluble in a caustic alkali solution of ½% to 2½% concentration, while at this stage retaining said lignin in the materials, by heating the materials under atmospheric pressure with an 85-95% aqueous alkyl monohydric alcohol having 1 to 3 carbon atoms in the molecule and containing ½–2½% of hydrogen chloride (calculated on the weight of the aqueous alcohol), removing the aqueous alcohol from the materials, and subsequently treating the materials with a ½–2½% aqueous alkali solution whereby the solubilized lignin is removed therefrom.

2. Process for the production of cellulose from ligno-cellulosic materials, which comprises pre-digesting the materials with a hot dilute alkali solution, mechanically disintegrating the pre-treated materials and then rendering the lignin in the materials soluble in a caustic alkali solution of ½% to 2½% concentration, while at this stage retaining said lignin in the materials, by heating the materials under atmospheric pressure with an 85-95% aqueous alkyl monohydric alcohol having 1 to 3 carbon atoms in the molecule and containing ½–2½% of hydrogen chloride (calculated on the weight of the aqueous alcohol), removing the aqueous alcohol from the materials, and subsequently treating the materials with a ½–2½% aqueous alkali solution whereby the solubilized lignin is removed therefrom.

3. Process for the production of cellulose from straw, which comprises pre-digesting the straw with a hot dilute alkali solution, mechanically disintegrating the pre-treated straw, and then rendering the lignin in the straw soluble in a caustic alkali solution of ½% to 2½% concentration, while at this stage retaining said lignin in the straw, by boiling the straw under atmospheric pressure with 90-95% aqueous ethanol containing ½–2½% of hydrogen chloride (calculated on the weight of the aqueous ethanol), removing the aqueous ethanol from the straw, and subsequently boiling the straw with an alkali metal hydroxide solution of concentration ½–2½% whereby the solubilized lignin is removed therefrom.

4. Process according to claim 1, wherein, after removal of the lignin by means of the alkali solution, the product is bleached with a hypochlorite and then given a purifying treatment including a treatment with a solution of an alkali metal hydroxide of concentration between 10% and 15% in the cold, followed by treatment with a hot solution of an alkali metal hydroxide of concentration between 0.4% and 0.8%.

5. Process according to claim 3, wherein, after removal of the lignin by means of the alkali metal hydroxide solution, the product is bleached with a hypochlorite and then given a purifying treatment including a treatment with a solution of an alkali metal hydroxide of concentration between 10% and 15% in the cold, followed by treatment with a hot solution of an alkali metal hydroxide of concentration between 0.4% and 0.8%.

6. Process for the production of cellulose from straw, which comprises pre-digesting the straw with a hot, dilute alkali solution, as the next chemical treatment rendering lignin in the straw soluble in a caustic alkali solution of ½–2½% concentration, while at this stage retaining said lignin in the straw, by heating the straw under atmospheric pressure with an 85-95% aqueous alkyl monohydric alcohol having 1 to 3 carbon atoms in the molecule and containing ½–2½% of hydrogen chloride calculated on the weight of the aqueous alcohol, removing the aqueous alcohol from the straw, and subsequently treating the straw with ½–2½% aqueous alkali solution whereby the solubilized lignin is removed therefrom.

7. Process for the production of cellulose from straw, which comprises pre-digesting the straw with a hot, dilute alkali solution, as the next chemical treatment rendering lignin in the straw soluble in a caustic alkali solution of ½–2½% concentration, while at this stage retaining said lignin in the straw, by heating the straw under atmospheric pressure with an 85-95% aqueous ethanol and containing ½–2½% of hydrogen chloride calculated on the weight of the aqueous ethanol, removing the aqueous ethanol from the straw, and subsequently treating the straw with ½–2½% aqueous alkali solution whereby the solubilized lignin is removed therefrom.

8. Process for the production of cellulose from straw, which comprises pre-digesting the straw with a hot, dilute alkali solution, as the next chemical treatment rendering lignin in the straw soluble in a caustic alkali solution of ½–2½% concentration, while at this stage retaining said lignin in the straw, by heating the straw under atmospheric pressure with an 85-95% aqueous isopropanol and containing ½–2½% of hydrogen chloride calculated on the weight of the aqueous isopropanol, removing the aqueous isopropanol from the straw, and subsequently treating the straw with ½–2½% aqueous alkali solution whereby the solubilized lignin is removed therefrom.

CLAUDE BONARD.
*Administrator of the Estate of the said Henry Dreyfus.*

(References on following page)

REFERENCES CITED

The following references are of record in the file of this patent:

UNITED STATES PATENTS

| Number | Name | Date |
|---|---|---|
| 1,806,703 | Ott | May 26, 1931 |
| 1,816,394 | Muller | July 28, 1931 |
| 1,855,567 | Kleinert | May 3, 1932 |
| 1,932,904 | McKee | Oct. 31, 1933 |
| 2,005,190 | Kipper | June 18, 1935 |
| 2,022,654 | Dreyfus | Dec. 3, 1935 |
| 2,022,664 | Goombridge | Dec. 3, 1935 |
| 2,037,001 | Avonavsky | Apr. 14, 1936 |
| 2,042,705 | Dreyfus | June 2, 1936 |
| 2,060,068 | Goombridge | Nov. 10, 1936 |
| 2,106,797 | Dreyfus | Feb. 1, 1938 |
| 2,110,545 | Dreyfus | Mar. 8, 1938 |

OTHER REFERENCES

"Industrial & Engineering Chemistry," Nov. 1936, pages 1270 to 1276.

"Paper Trade Journal," Mar. 12, 1942, pages 31 to 36.

"Paper Industry & Paper World," Mar. 1941, pages 1243, 1244.